United States Patent [19]

Swain

[11] Patent Number: 4,723,887
[45] Date of Patent: Feb. 9, 1988

[54] LOAD CARRYING AND TIPPING VEHICLE

[76] Inventor: Hugh D. Swain, 4 Genesta Crescent, Dalkeith, Western Australia, Australia

[21] Appl. No.: 778,187
[22] PCT Filed: Jan. 29, 1985
[86] PCT No.: PCT/AU85/00014
 § 371 Date: Sep. 17, 1985
 § 102(e) Date: Sep. 17, 1985
[87] PCT Pub. No.: WO85/03264
 PCT Pub. Date: Aug. 1, 1985

[30] Foreign Application Priority Data

Jan. 27, 1984 [AU] Australia .............................. PG3379
Feb. 8, 1984 [AU] Australia .............................. PG3518
Apr. 16, 1984 [AU] Australia .............................. PG4596

[51] Int. Cl.$^4$ .............................................. B65G 67/30
[52] U.S. Cl. ................................... 414/385; 280/419; 280/492; 298/5; 298/20 R
[58] Field of Search ............................. 298/5, 20 R, 2; 414/376, 385, 386, 575, 576, 582, 583, 724; 280/419, 492

[56] References Cited

U.S. PATENT DOCUMENTS 1,629,721  5/1927  Malmgren .......................... 414/583
2,174,493  9/1939  Vanderwerf ..................... 280/773 X
2,189,079  2/1940  Mueller et al. ........................ 298/2
2,612,385  9/1952  Piltz .................................... 280/419
2,772,918 12/1956  Klinger ................................. 298/5
3,478,902 11/1969  Anderson et al. ................. 414/385

FOREIGN PATENT DOCUMENTS 261263   7/1965  Australia ................................ 298/5
1095200 12/1960  Fed. Rep. of Germany ...... 414/386
876109   7/1942  France .................................... 298/5
731476   6/1955  United Kingdom ................ 280/493

OTHER PUBLICATIONS

European Patent Application No. 0079088; published May 18, 1983.

Primary Examiner—Leslie J. Paperner
Attorney, Agent, or Firm—Harness, Dickey & Pierce

[57] ABSTRACT

A load carrying and tipping vehicle (11) adapted to be coupled to a power-operable vertically movable part (15) of a motor vehicle (13) such as a front end loader in which case the bucket of the front end loader constitutes the vertically movable part. The load carrying and tipping vehicle (11) has a load carrying portion (21) which is supported on two wheels (29) and which is tippable in a vertical plane parallel to the direction of travel of the vehicle (11). A coupling mechanism (41) is provided for detachably coupling one end (25) the load carrying portion to the bucket (15) of the front end loader whereby raising of the bucket (15) effects tipping of the load carrying portion (21). The coupling mechanism (41) provides a pivotal connection between the bucket (15) and the load carrying portion (21) about a first pivot axis (48) which is substantially horizontal and transverse to the direction of travel of the vehicle (11).

13 Claims, 14 Drawing Figures

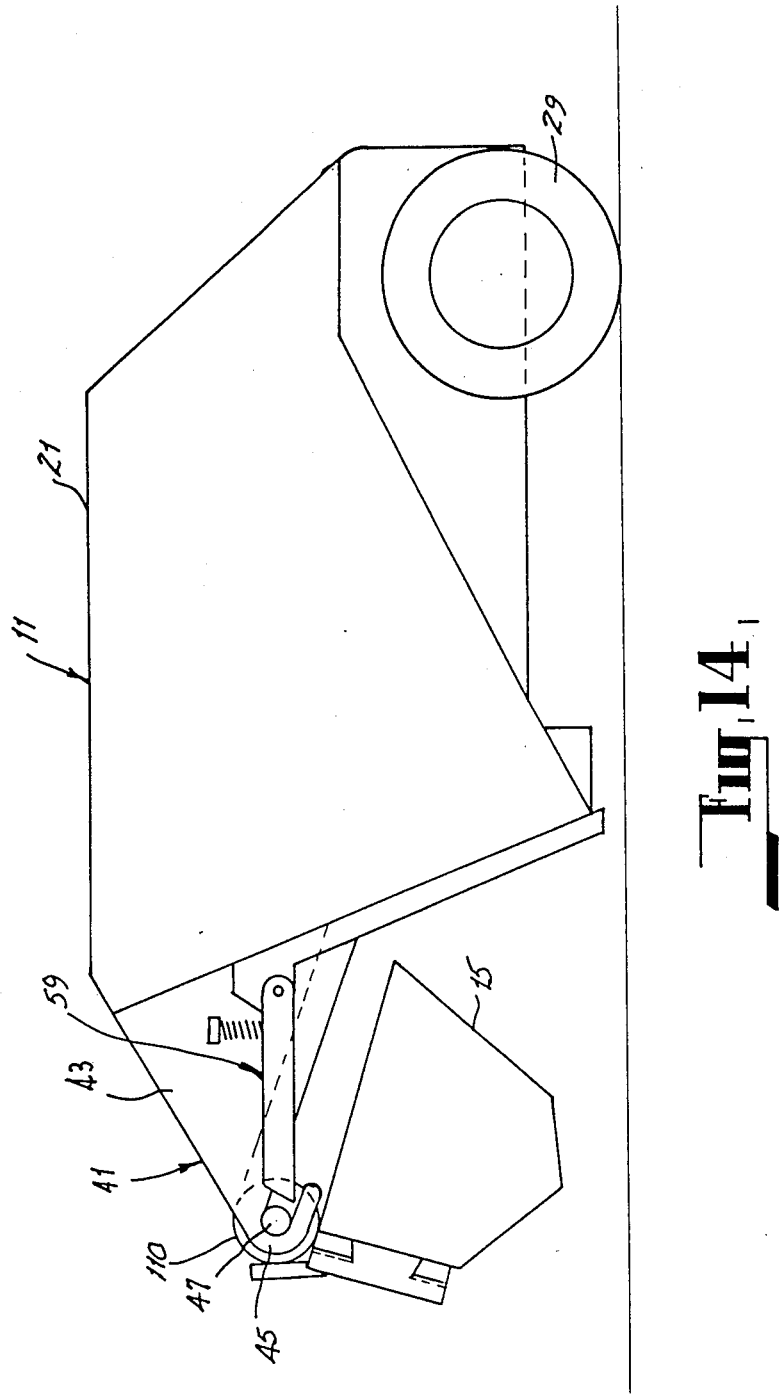

LOAD CARRYING AND TIPPING VEHICLE

This invention relates to a load carrying and tipping vehicle.

In one form the invention resides in a load carrying and tipping vehicle adapted to be coupled to a motor vehicle having a power-operable vertically movable part, said load carrying and tipping vehicle comprising: a load carrying portion tippable in a vertical plane parallel to a direction of travel of the load carrying vehicle for discharging a carried load therefrom; and coupling means for releasably coupling the load carrrying portion to the vertically movable part of the motor vehicle, said coupling means providing a pivotal connection between said vertically movable part and the load carrying portion about a first substantially horizontal pivot axis transverse to said direction of travel, wherein upward movement of said vertically movable part effects tipping of the load carrying portion.

Preferably, the load carrying portion has two opposed ends aligned with said direction of travel, said coupling means being disposed at one of said ends.

Preferably, the coupling means comprises first engaging means associated with the load carrying portion, and second engaging means associated with said vertically movable part of the motor vehicle, and adapted to co-operate with the first engaging means, said first and second engaging means providing said pivotal connection about said first pivot axis.

Preferably, the coupling means further comprises a coupling frame supporting the first engaging means and pivotally mounted on the load carrying portion at or near said one end thereof for pivotal movement about a second pivot axis parallel to said first pivot axis, said coupling frame having an engaging portion engagable during the latter part of tipping movement with the vertically movable part of the motor vehicle for maintaining the attitude of the coupling frame substantially constant relative to the vertically movable part.

Preferably, the load carrying portion has a ground engagable portion at the end thereof opposite said one end, the ground engagable portion being adapted to engage the ground in the latter part of tipping of the load carrying portion whereby the load carrying portion may pivot on the ground surface. The ground engagable portion is preferably of arcuate configuration whereby it may roll on the ground surface.

Preferably, the load carrying portion is supported for movement across the ground surface on a pair of co-axial wheels. The wheels are preferably steerable by means of a steering mechanism which is adapted for operative connection to the steering system of the motor vehicle, said operative connection including a pivotal yoke and a pivotal spigot engagable in the yoke, the yoke and spigot being adapted for operative movement along a line substantially co-incident with said first pivot axis.

Preferably, the motor vehicle comprises a front end loader the loading bucket of which constitutes said vertically movable part. With this arrangement, the front end loader may be used to load material into the load carrying portion of the load carrying and tipping vehicle. After the loading operation the front end loader may be coupled to the load carrying and tipping vehicle and then utilised to either push or pull that vehicle to a location at which the carried material is to be dumped. To effect tipping, the bucket of the front end loader is raised.

The invention will be better understood by reference to the following description of two specific embodiments thereof as shown in the accompanying drawings in which:

FIG. 14 is a view similar to FIG. 13 except that the load carrying and tipping vehicle is shown in the transport position.

Figure 1:
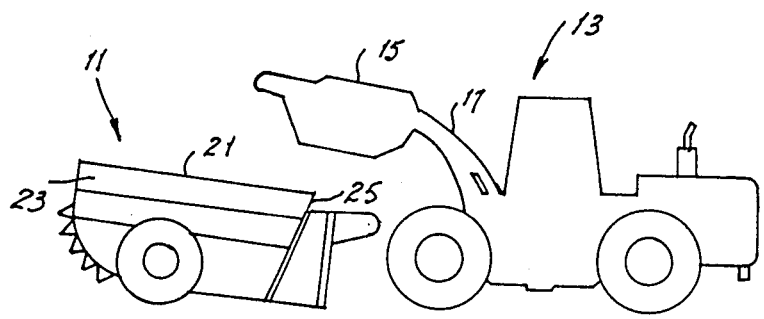
FIG. 1 is a schematic view illustrating a load carrying and tipping vehicle according to the first embodiment in a stationary position.
Figure 2:
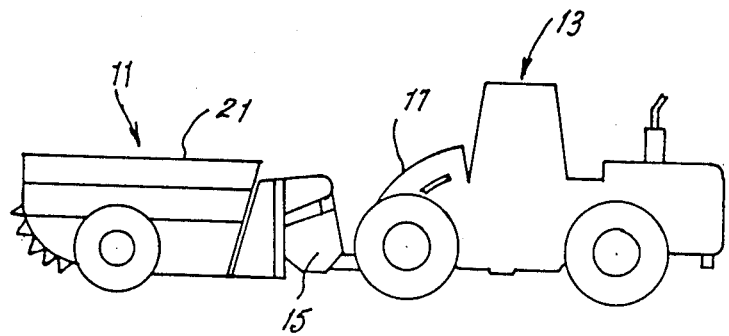
FIG. 2 is a schematic view illustrating the load carrying and tipping vehicle of the first embodiment in a transport position.
Figure 3:
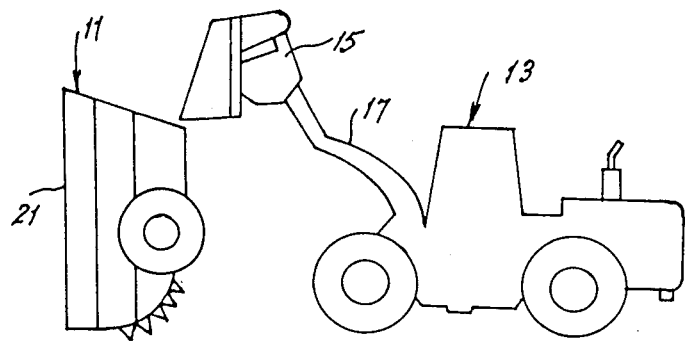
FIG. 3 is a schematic view illustrating the load carrying and tipping vehicle of the first embodiment in a tipping position.
Figure 4:
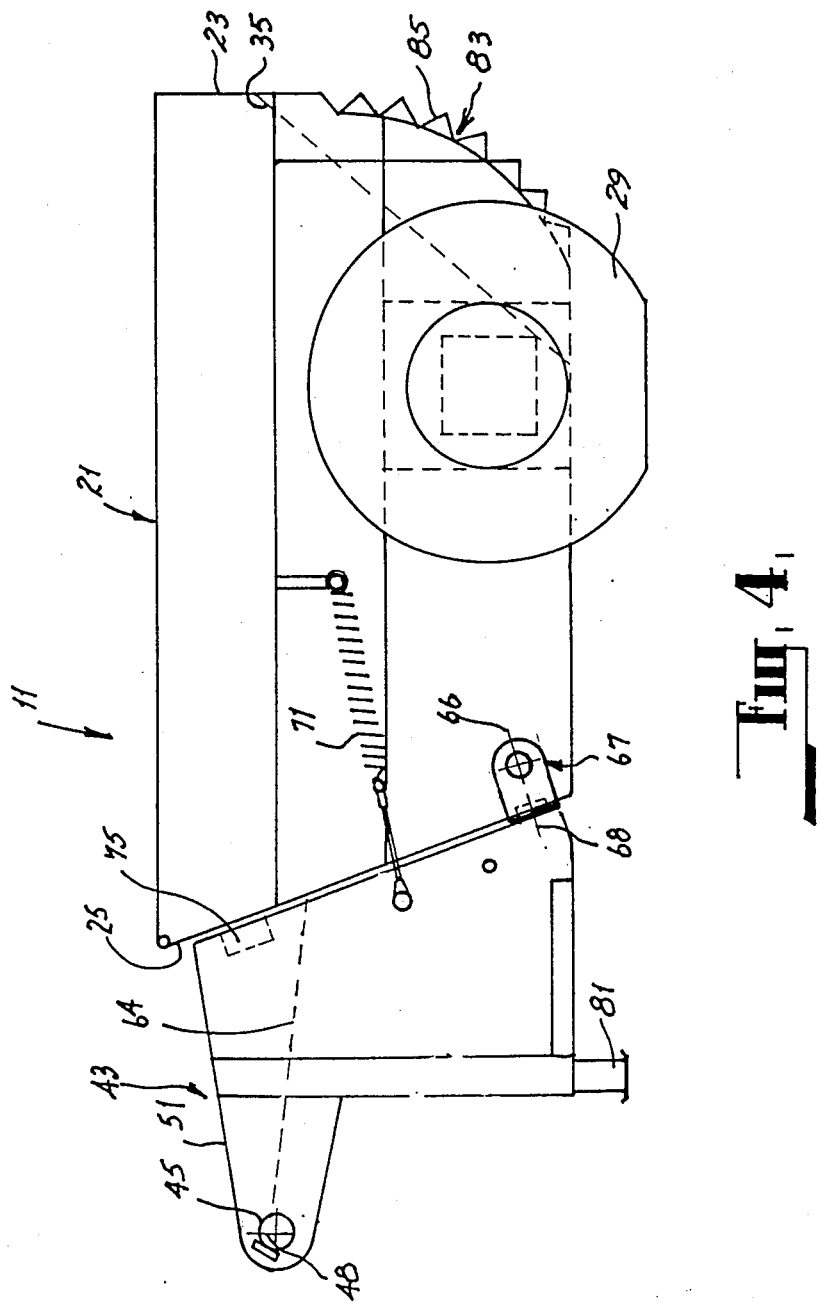
FIG. 4 is a side elevational view of the load carrying and tipping vehicle of the first embodiment.
Figure 5:
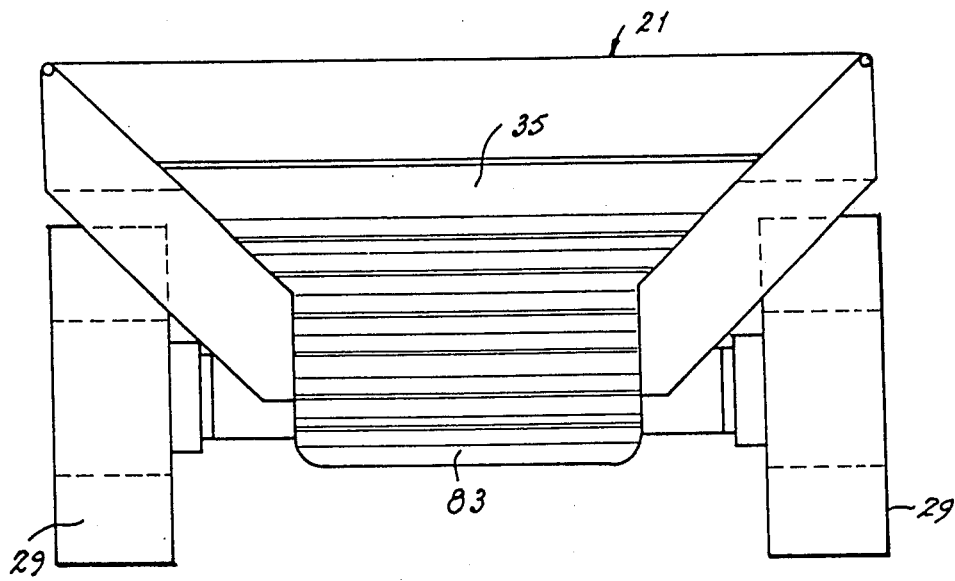
FIG. 5 is an elevational view of the load carrying and tipping vehicle of FIG. 4 from one end thereof.
Figure 6:
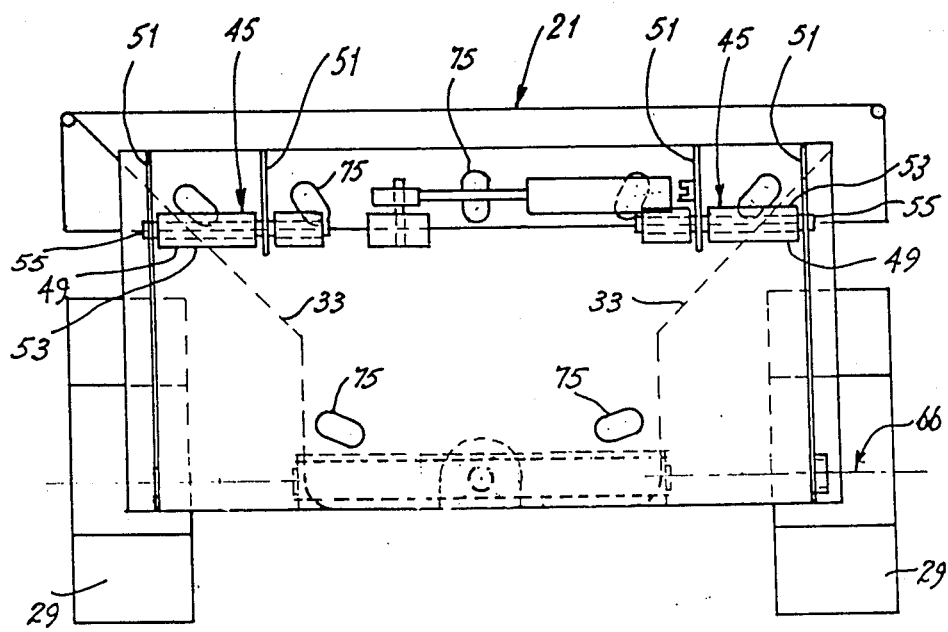
FIG. 6 is an elevational view of the load carrying and tipping vehicle of FIG. 4 from the other end thereof.

The first embodiment, which is shown in FIGS. 1 to 12 of the drawings, is directed to a load carrying and tipping vehicle 11 in the form of a dump cart for carting excavated material. The load carrying and tipping vehicle 11 is adapted to function in stationary, transporting and tipping modes. For operation in the transporting and tipping modes, the load carrying and tipping vehicle 11 is coupled to a motor vehicle having a power-operable vertically movable part. In the illustrated arrangement, the motor vehicle is in the form of an articulated front end loader 13 of known kind having a hydraulically-controlled bucket 15 supported on arms 17, whereby the bucket 15 constitutes the power-operable vertically movable part of the motor vehicle. With this arrangement, the front end loader 13 may be used to load material into the load carrying and tipping vehicle when the latter is in the stationary position (as shown in FIG. 1 of the drawings). After the loading operation, the front end loader may be coupled to the load carrying and tipping vehicle 11 and then utilised to propel that vehicle, either by pushing or pulling it, in the transport mode (as shown in FIG. 2) to a dumping area. At the dumping area, the bucket 15 of the front end loader is raised so as to effect the tipping action of the load carrying and tipping vehicle (as shown in FIG. 3).

The load carrying and tipping vehicle 11 comprises a load carrying portion 21 having a first (front) end 23 and a second (rear) end 25. The load carrying portion 21 supported on first ground engaging means in the form of ground wheels 29 located inwardly of its front end. The wheels 29 are steerable under the action of a steering mechanism 30 adapted to operate in combination with the steering system of the front end loader.

The load carrying portion 21 is in the form of a bin having a bottom wall 31, a pair of side walls 33, a front wall 35 and a rear wall 37.

The load carrying portion 21 is adapted to be coupled at its rear end to the bucket 15 of the front end loader 13 by way of a coupling means 41. The coupling means 41 comprises a coupling frame 43 mounted on the load carrying portion 21 adjacent the rear end thereof in a manner to be described hereinafter and first engaging means 45 supported on the coupling frame. The coupling means 41 further comprises a complimentary second engaging means 47 mounted on the bucket 15 of the front end loader and adapted to co-operate with the first engaging means 45. The first and second engaging means 45 and 47 respectively co-operate to couple the load carrying and tipping vehicle 11 to the front end loader 13 while providing a pivotal connection with permits relative movement therebetween about a first axis 48 which is substantially horizontal and transverse to the direction of travel of the load carrying and tipping vehicle.

The first coupling means 45 is in the form of a pair of spaced coupling pins 49 the central longitudinal axis of each of which is co-incident with said first axis. The coupling pins 49 each comprise a cylindrical sleeve 53 freely rotatable about a shaft 55 supported at its ends between a respective pair of spaced rearwardly extending arm members 51 which form part of the coupling frame.

The second engaging member 47 comprises a pair of hook members 57 mounted on the bucket 15 of the front end loader and extending forwardly of the bucket. The hook members 57 are at a spacing corresponding to the spacing between the coupling pins 49 and are adapted to engage beneath the coupling pins. Each hook member 57 is fitted with a locking mechanism 59 for releasably locking the respective pin in the hook member. Each locking mechanism includes a locking bolt 61 mounted for selective reciprocal movement between a retracted position in which it is clear of the open portion of the hook to permit the hook to engage or disengage its respective coupling pin and an extended position in which the locking bolt overlays the open portion of the hook to retain the respective locking pin in the hook. A hydraulically operable actuating mechanism is provided for moving each locking bolt between the extended and retracted positions.

The coupling frame has an engaging portion 64 which is adapted to bear against the leading edge 16 of the bucket 15 during the latter part of the tipping operation, the purpose of which will become apparent hereinafter. In this embodiment, the underside of the arm members 51 constitute the engaging portion of the coupling frame.

As stated hereinbefore, the coupling frame 43 is mounted on the load carrying portion 21 at the rear end thereof. More particularly, the coupling frame 43 is pivotally connected at its front lower end to the rear lower end of the load carrying portion 21. The pivotal connection between the coupling frame 41 and the load carrying portion 27 permits relative movement therebetween about a second pivot axis 66 which is parallel to the first pivot axis 48 (i.e. substantially horizontal and transverse to the direction of motion of the body). Further, the pivotal connection provides a third axis 68 which extends generally fore-and-aft of the load carrying and tipping vehicle when the latter is in the transport position. Relative movement about the first and second axes permits pitching movement between the coupling frame 41 and the load carrying portion 21 so as to accommodate undulations or irregularities in the ground surface. Likewise, relative movement about the third axis permits lateral swaying movement between the coupling frame and the load carrying portion so as to also accommodate irregularities in the ground surface.

The connection between the coupling frame 41 and the load carrying portion 21 is in the form of a bracket 67. The bracket 67 is pivotally mounted on the load carrying portion for pivotal movement relative thereto about the second axis. The bracket 67 is also pivotally mounted to the coupling frame for pivotal movement relative thereto about the third axis.

As is evident from the drawings, the second pivot axis 66 is located below the first pivot axis 48 when the load carrying and tipping vehicle 11 is in the transport position. This feature serves to reduce the height to which the bucket 15 of the front end loader has to be raised to effect tipping of the load carrying portion 27 as will become apparent hereinafter.

A dampening means 71 is provided for damping relative movement between the coupling frame 43 and the load carrying portion 21 about the second and third axes. The dampening means is in the form of a helical tension spring acting between the coupling frame and the load carrying portion on each side thereof.

A second ground engaging means is provided for supporting the rear end of the load carrying portion when the load carrying and tipping vehicle is in the stationary position. The second ground engaging means is in the form of a pair of legs 81 mounted on the coupling frame.

The coupling frame 41 has abutment means for bearing against the load carrying portion 21 when the load carrying and tipping vehicle is in the stationary or transport positions, for the purpose of limiting upward pivotal movement of the coupling frame relative to the load carrying portion about the second pivot axis. The abutment means is in the form of a plurality of rollers 75 the axes of rotation of which intersect the third axis 68 so as to permit the relative lateral rocking movement between the coupling frame and the body. With the abutment means bearing against the load carrying portion, the coupling frame is able to support the adjacent end of the load carrying portion in circumstances where the coupling frame is itself supported by the legs or attached to the bucket 15 of the front end loader.

A ground engagable portion 83 is provided at the lower front end of the load carrying portion 21. The ground engagable portion 83 is adapted to move into engagement with the ground surface as the load carrying portion undergoes tipping movement so as to use the ground surface as a pivot during the latter stages of the tipping operation. The ground engagable portion is of arcuate configuration so that it may roll on the ground surface during tipping and has a plurality of protrusions 85 for positive engagement with the ground surface.

Figure 7:
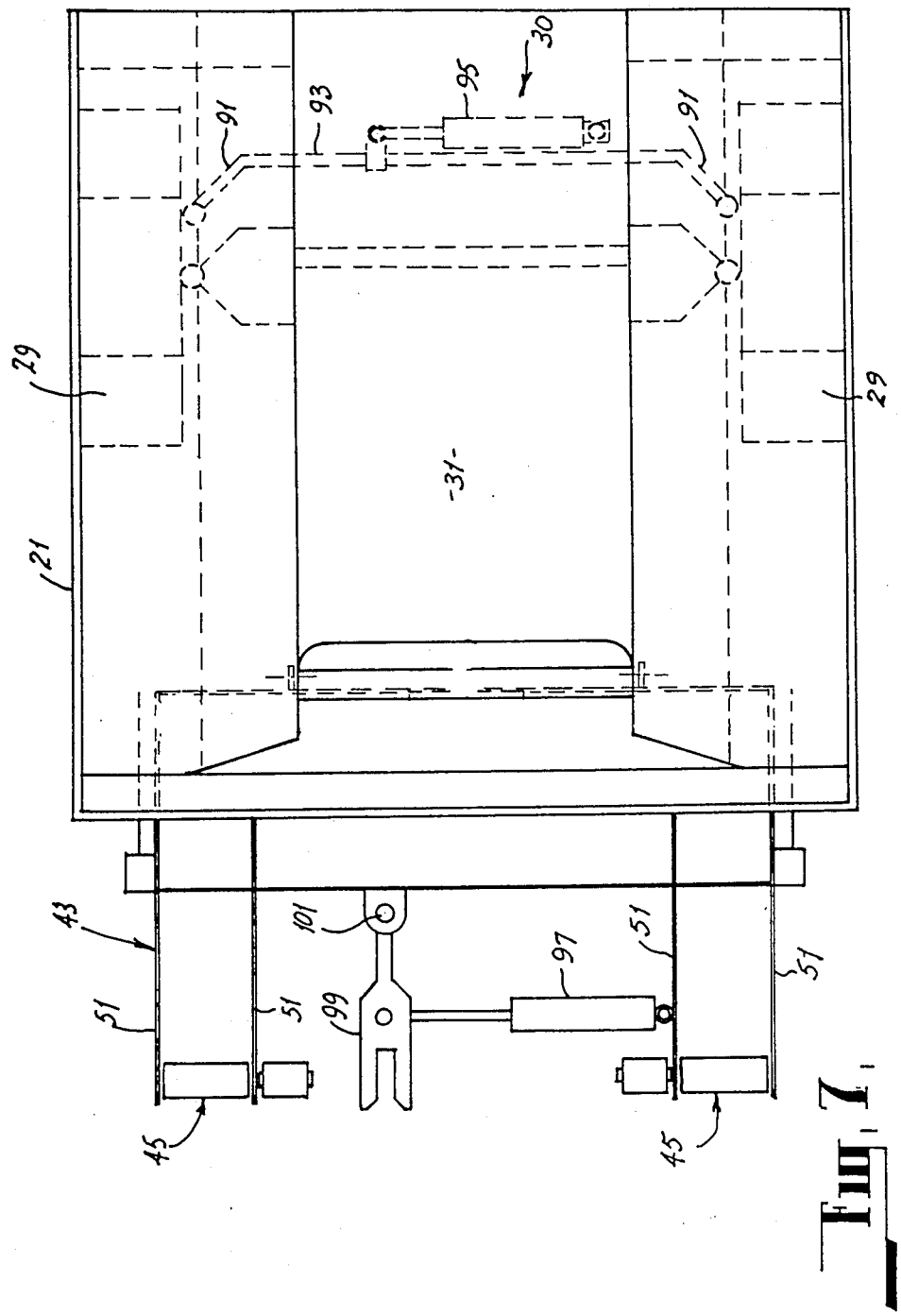
FIG. 7 is a plan view of the load carrying and tipping vehicle of FIG. 4.
Figure 8:
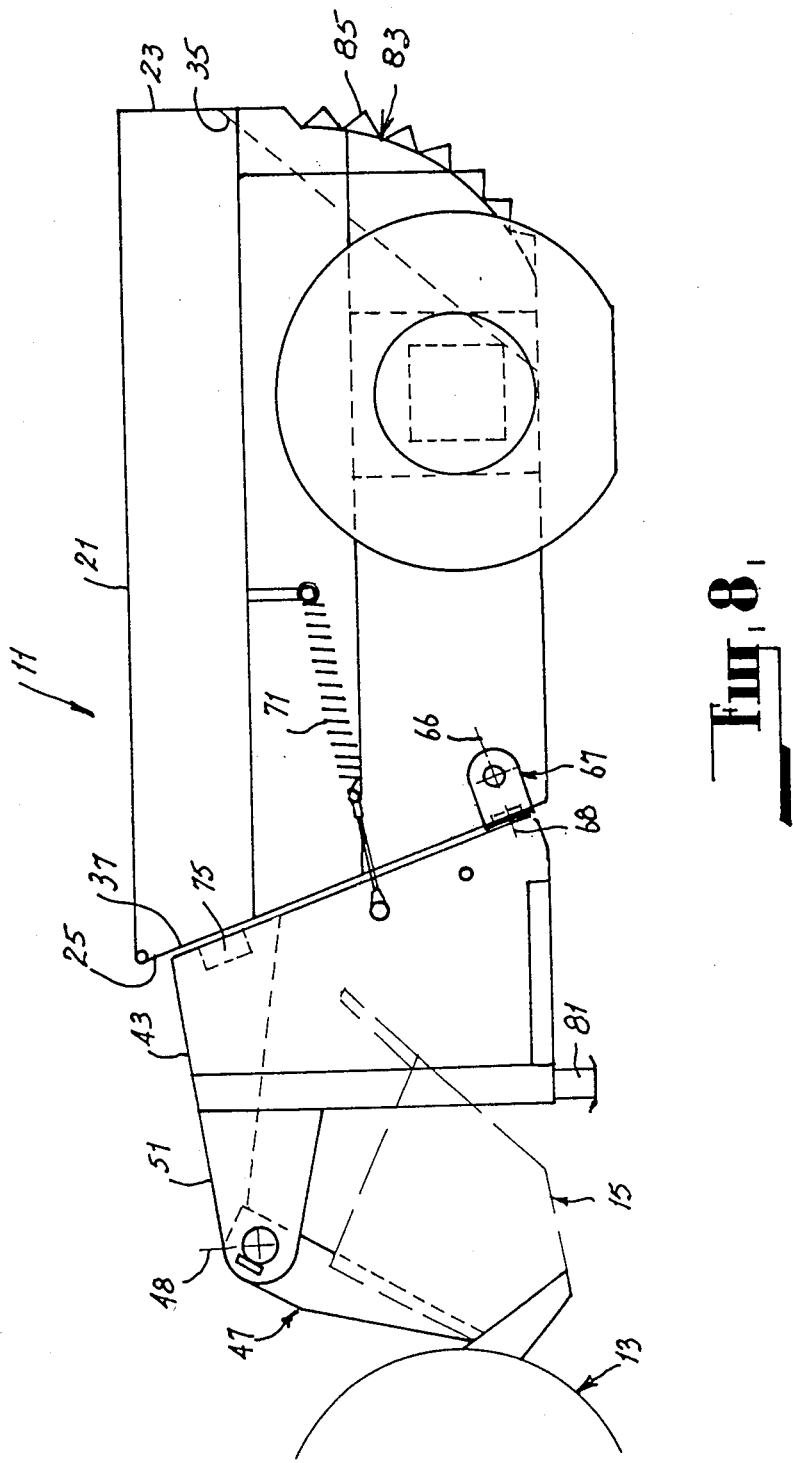
FIG. 8 is a side elevational view showing the load carrying and tipping vehicle of FIG. 4 in the transport position.
Figure 9:
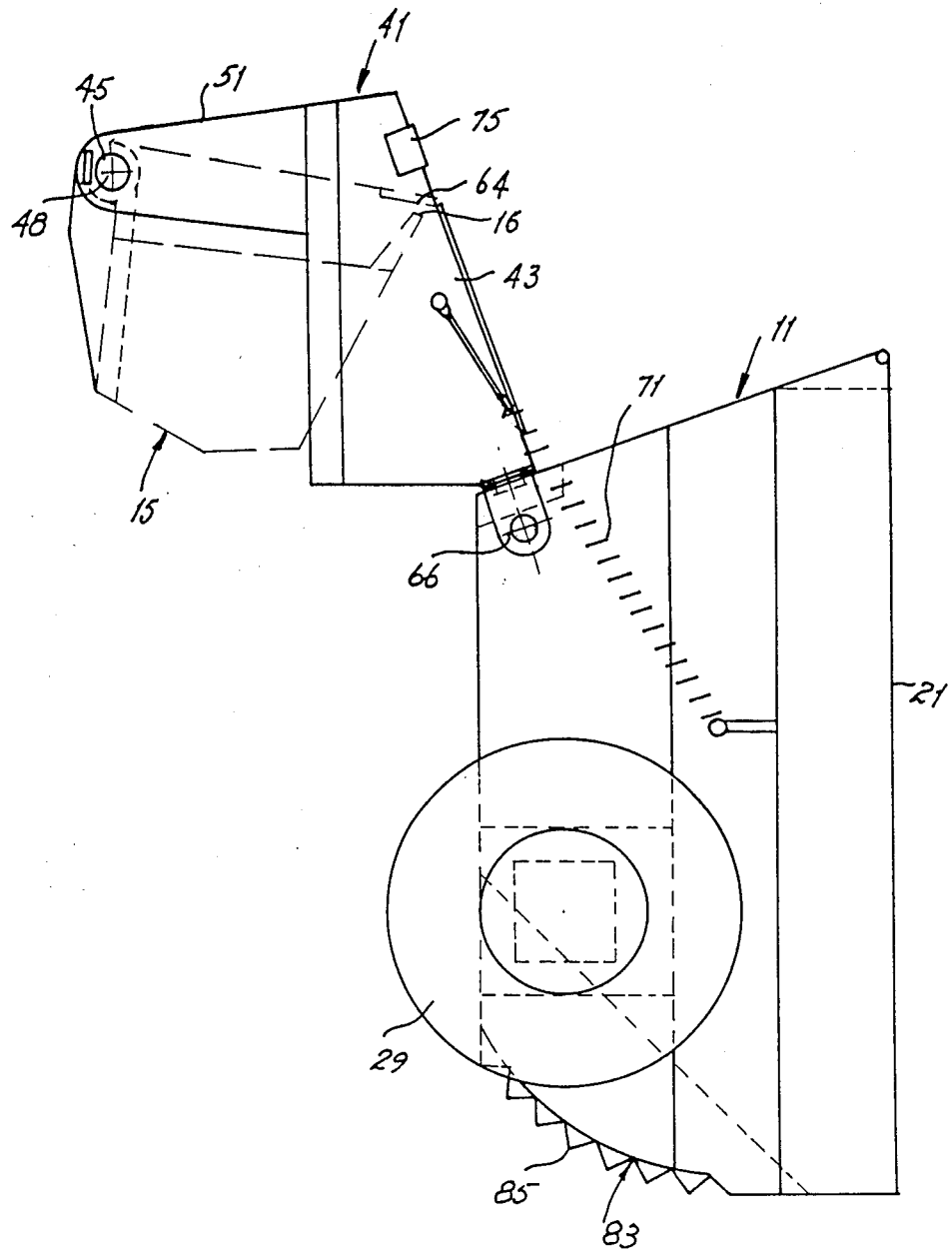
FIG. 9 is a side elevational view showing the load carrying and tipping vehicle of FIG. 4 in the tipping position.
Figure 10:
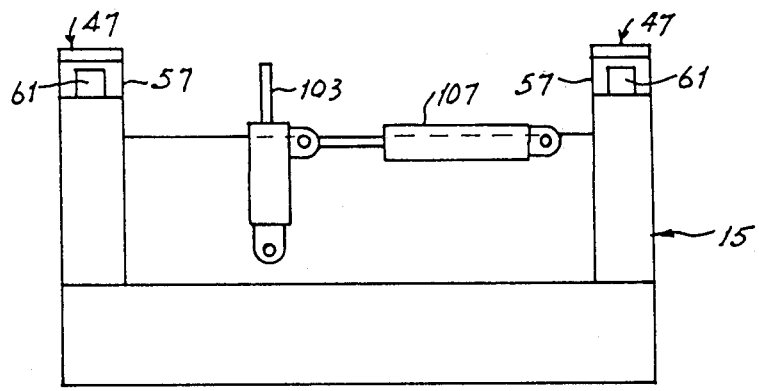
FIG. 10 is a rear elevational view of a bucket of a front end loader adapted to be coupled to the load carrying and tipping vehicle of the first embodiment.
Figure 11:
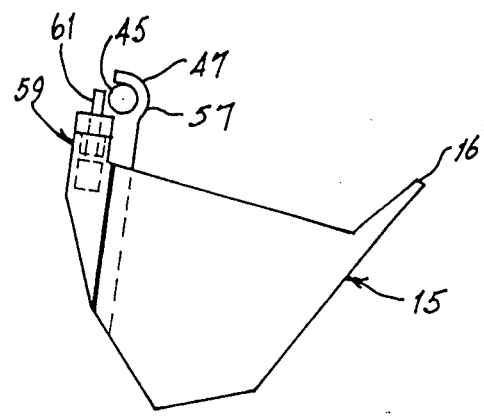
FIG. 11 is a side elevational view of the bucket of FIG. 10 illustrating part of the coupling means.
Figure 12:
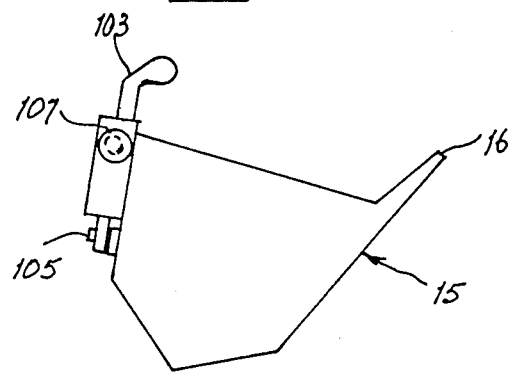
FIG. 12 is a side elevational view of a bucket of FIG. 10 illustrating part of the steering mechanism for the load bearing and tipping vehicle.

As mentioned hereinbefore, the wheels 29 are steerable under the action of a steering mechanism 30 operable in combination with the steering system of the front end loader. Referring to FIG. 7 of the drawings, the steering mechanism 30 includes a steering arm 91 operatively connected to each wheel 29. The steering arms are interconnected by a connecting rod 93 for movement in unison. A first power device is in the form of a first hydraulic ram 95 is operatively coupled to the connecting rod for controlling axial movement thereof to alter the track of the steerable wheels 29. A second power device is operatively coupled to the first power device. More particularly, the second power device is in the form of a second hydraulic ram 97 which is coupled by way of a hydraulic circuit to the first hydraulic ram.

A yoke 99 is pivotally mounted at 101 on the coupling frame 43 for pivot movement in the plane parallel to the first pivot axis 48. The second hydraulic ram 97 is pivotally connected between the yoke 99 and the coupling frame whereby pivotal movement of the yoke effects extension or retraction of the hydraulic ram according to the direction of such pivotal movement.

The yoke 99 is adapted to receive a spigot 103 (FIG. 12) pivotally mounted at 105 on the bucket 15 of the front end loader. The spigot and yoke are so arranged that the two zones at which the spigot and yoke may contact each other are aligned with the first pivot axis 48 between the load carrying and tipping vehicle and the bucket of the front end loader. Pivotal movement of the spigot is controlled by a third power device in the form of a third hydraulic ram 107 coupled to the spigot and incorporated in the hydraulic circuit of the steering system of the articulated front end loader. In this way, the spigot 103 is responsive to operation of the steering sytem of the front end loader, the extent of pivotal movement of the spigot being proportional to the extent to which the steering system is operated.

With the spigot 103 received in the yoke, pivotal movement of the spigot effects pivotal movement of the yoke 99 which in turn effects extension or retraction of the second hydraulic ram 97 according to the direction of turning of the front end loader. The operation of the second hydraulic ram 97 effects operation of the first hydraulic ram 95 and this in turn operates the connecting rod 93 so as to alter the track of the steerable wheels 29.

The arrangement of the spigot 103 and yoke 99 permits relative pivotal movement between the load carrying portion relative to the bucket 15 of the front end loader about the first pivot axis without affecting operation of the steering mechanism. The reason for this is that the zone of contact between the spigot and the yoke as the spigot moves in either direction, is co-incident with the first pivot axis. In other words, the zone of contact follows a chord of the arcuate path generated by the pivotting spigot which chord is co-incident with the first pivot axis.

Because the wheels 29 are locate at a greater distance from the axis about which the front end loader articulates than are the actual wheels of the front end loader, it is desirable during steering that first the track of the wheels 29 is altered to a greater extent than is the track of the front end loader wheels, and secondly that the extent of this differential is increased with the extent of operation of the steering system. This first aspect may be achieved by appropriate selection of steering geometry and relative sizes of the various hydraulic rams. The yoke and spigot arrangement in itself achieves the second aspect. This is because the extent of extension or retraction of the second hydraulic cylinder varies proportionately with the extent of pivotal movement of the yoke away from its mid-position which is shown in FIG. 7.

Operation of the load carrying and tipping vehicle 11 will now be described. With the load carrying and tipping vehicle detached from the front end loader 13, the front end loader may be used to load excavated material into the load carrying portion 21. At this stage, the load carrying portion 21 is supported by the ground wheels 29 and the ground engaging legs 81. On completion of the loading operation, the front end loader is coupled to the load carrying and tipping vehicle 11 so that vehicle may be propelled to a dump site at which the carried material may be discharged. To couple the front end loader 13 to the load carrying and tipping vehicle 11, the bucket 15 of the front end loader is presented to the coupling means 41 in the load position so that the hook members 57 may engage the underside of the coupling pins 49. The locking bolts 61, which are at this stage in the retracted position, are then moved into the extended position so as to overlay the coupling pins and secure them in position within the hook members. The bucket 15 is then rotated to the carry position so as to lift the legs 81 from engagement with the ground to permit the load carrying and tipping vehicle 11 to be propelled (either by pushing or pulling it) towards the dump site. At the dump site, the bucket 15 is raised further so as to cause the body 21 to pivot about the central axis of the road wheels 29 until such time as the ground engagable portion 83 moves into contact with the ground. Thereafter, on continued upward movement of the bucket of the front end loader, the load carrying portion 21 turns on the ground surface until it attains the tipping position as shown in FIG. 3 of the drawings.

As the bucket is raised so as to cause the load carrying portion to move towards the tipping position, the load carrying position 21 first pivots relative to the bucket about the first pivot axis 48. The bucket 15 is maintained at a constant attitude as it rises and because of this the engaging portion 64 of the coupling frame eventually moves into contact with the leading edge 16 of the bucket. This has the effect of stopping pivotal movement of the load carrying portion relative to the bucket above the first pivot axis 48. As a consequence of this, the coupling frame is caused to pivot about the second pivot axis 66 and so progressively swing away from the load carrying portion as the bucket continues to rise. The effect of this is that the load carrying portion 21 now pivots relative to the bucket about the second pivot axis (and not the first pivot axis) until the tipping position is attained, as shown in FIG. 3. As the load carrying portion approaches the tipping position, it preferably moves through an over-centre position to facilitate complete discharge of the carried load. The load carrying portion is returned from the tipping position by lowering of the bucket.

Figure 13:
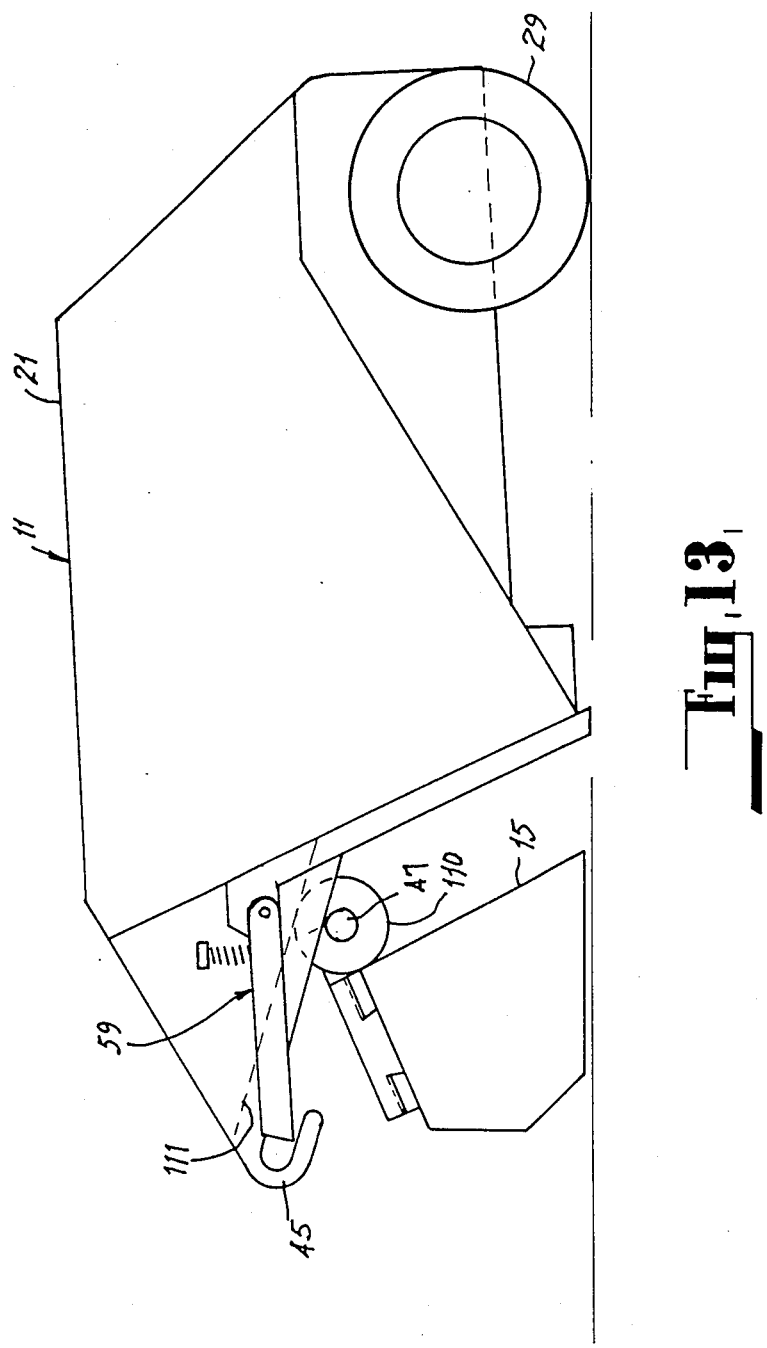
FIG. 13 is a side elevational view of a load carrying and tipping vehicle according to the second embodiment in the stationary position.

The second embodiment of the invention, which is shown in FIGS. 13 and 14 of the drawings, is somewhat similar to the first embodiment and so like reference numerals are used to designate corresponding parts. In this arrangement, the coupling frame 43 is not pivotally connected to the load carrying portion 21 but rather is rigidly secured thereto and is in the form of cantilever. The coupling frame 43 supports the first engaging means 45 which comprises a pair of hooks. The complimentary second engaging means 47 is mounted on the bucket 15 of the front end loader and comprises a pair of coupling pins. The bucket 15 is provided with a roller means 110 which is adapted to engage against a ramp surface 111 formed on the underside of the coupling frame and roll therealong so as to guide the bucket towards a position in which the coupling pins carried thereon are received in the hooks. The first and second engaging means provide a pivotal connection for relative rotation between the bucket 15 and the load carrying portion 21 about the first axis. This pivotal connection is the only pivotal connection between the bucket and the load carrying portion. A locking mechanism 59 is provided for releasably locking each coupling pin in its respective hook.

It should be appreciated that the scope of the invention is not limited to the scope of the two embodiments described.

The claims defining the invention are as follows:

1. A load carrying and tipping vehicle adapted to be coupled to a motor vehicle having a power-operable vertically movable part, said load carrying and tipping vehicle comprising: a load carrying portion supported upon a single pair of wheels at only one end thereof and tippable about an axis defined at least initially by said pair of wheels in a vertical plane parallel to a direction of travel of the load carrying vehicle for discharging a carried load therefrom; and coupling means for releasably coupling the load carrying portion to the vertically movable part of the motor vehicle, said coupling means including a coupling member, means providing a first pivotal connection between said vertically movable part and said coupling member about a first substantially horizontal pivot axis transverse to said direction of travel, and means providing a second pivotal connection between said coupling member and said load carrying portion about a second pivotal axis parallel to said first pivot axis, said second pivot axis being positioned vertically below said first pivot axis when said vertically movable part is in a lowered position and when said load carrying portion is in a load carrying position, upward movement of said vertically movable part from said lowered position initially effects tipping of the load carrying portion and said coupling means as a unit about said wheels and upon continued upward movement, said load carrying portion pivots relative to said coupling means.

2. A load carrying and tipping vehicle according to claim 1 wherein the load carrying portion has two opposed ends aligned with said direction of travel, said coupling means being disposed at one of said ends.

3. A load carrying and tipping vehicle according to claim 1 wherein the coupling means comprises first engaging means associated with the load carrying portion, and second engaging means associated with said vertically movable part of the motor vehicle and adapted to co-operate with the first engaging means, said first and second engaging means providing a detachable pivotal connection about said first pivot axis.

4. A load carrying and tipping vehicle according to claim 3 wherein one of said first and second engaging means comprises a hook means and the other of said first and second engaging means comprises a coupling pin receivable in the hook means.

5. A load carrying and tipping vehicle according to claim 3 wherein the coupling member comprises a coupling frame supporting the first engaging means and pivotally mounted on the load carrying portion contiguous to said one end thereof for pivotal movement about said second pivot axis, said coupling frame having an engaging portion engagable during the latter part of tipping movement with the vertically movable part of the motor vehicle for maintaining the attitude of the coupling frame substantially constant relative to the vertically movable part.

6. A load carrying and tipping vehicle according to claim 5 wherein the coupling frame is so shaped that the first pivot axis is located above the second pivot axis and closer to said vertically movable part.

7. A load carrying and tipping vehicle according to claim 5, wherein the coupling frame is mounted on the load carrying portion for pivotal movement therebetween about a third pivot axis extending generally parallel to said direction of travel.

8. A load carrying and tipping vehicle according to claim 3 wherein the load carrying portion has a ground engagable portion at the end thereof opposite said one end, the ground engagable portion being adapted to engage the ground in the latter part of tipping of the load carrying portion whereby the load carrying portion may pivot on the ground surface.

9. A load carrying and tipping vehicle according to claim 8 wherein the ground engagable portion is of arcuate configuration whereby it may roll on the ground surface.

10. A load carrying and tipping vehicle according to claim 1 wherein the load carrying portion is supported for movement across the ground surface on a pair of co-axial wheels.

11. A load carrying and tipping vehicle according to claim 10 wherein said wheels are steerable by means of a steering mechanism.

12. A load carrying and tipping vehicle according to claim 11 wherein said steering mechanism is adapted for operative connection to the steering system of the motor vehicle, said operative connection including a pivotal yoke and a pivotal spigot engagable in the yoke, the yoke and spigot being adapted for operative movement along a line substantially co-incident with said first pivot axis.

13. A load carrying and tipping vehicle according to claim 1 wherein said motor vehicle comprises a front end loader the bucket of which constitutes said vertically movable part.

* * * * *